Patented May 30, 1933

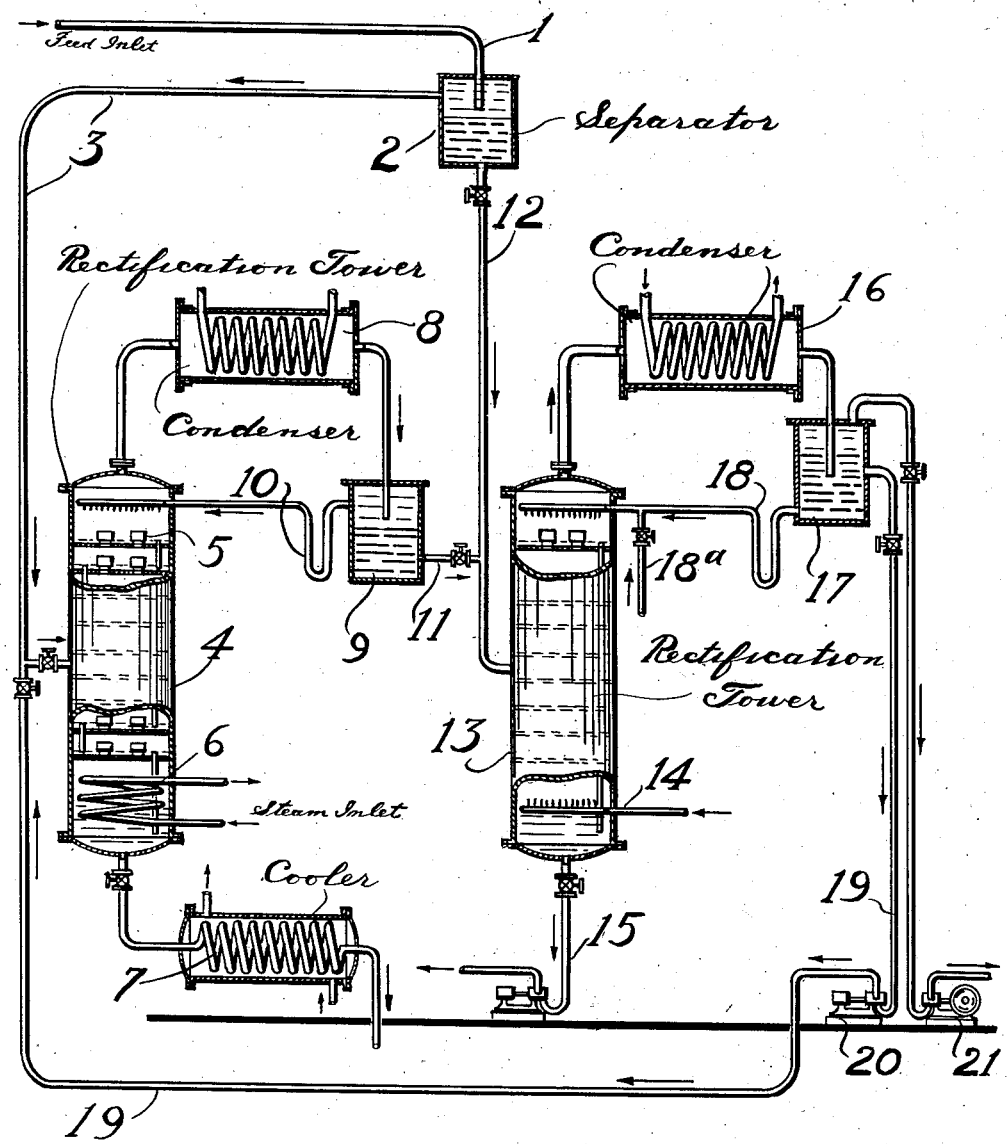

1,911,832

UNITED STATES PATENT OFFICE

WARREN K. LEWIS, OF NEWTON, MASSACHUSETTS, ASSIGNOR TO STANDARD OIL DEVELOPMENT COMPANY, A CORPORATION OF DELAWARE

PROCESS FOR SEPARATING MIXTURES OF SUBSTANCES ONLY PARTIALLY MISCIBLE

Application filed April 25, 1929. Serial No. 358,012.

The present invention relates to the separation of liquid mixtures and more specifically comprises an improved process for obtaining organic substances, which are only partially miscible with water, in a substantially anhydrous condition from aqueous mixtures. My invention will be fully understood from the following description and the drawing which illustrates one form of apparatus suitable for carrying out my invention.

The drawing is a semi-diagrammatic view in sectional elevation of an apparatus constructed according to my invention and indicates the flow of materials.

My invention will be described in connection with the separation of aqueous solutions of fusel oil to produce a mixture of substantially anhydrous higher alcohols, but it will be understood that the invention is applicable to other materials such as aniline and water, furfurol and water and in fact to separation of any aqueous solution of a substance or mixture of substances which is only partially miscible with water and in which homogeneous constant boiling mixtures are not formed. The class of materials to which my application can be applied with special advantage is constituted by alcohols higher than isopropyl alcohol. All the materials to which my invention can be applied are capable of forming constant boiling mixture with the water, in which case under a given pressure of distillation the vapors distilling overhead will have a constant composition and a constant temperature. However, this constant boiling mixture does not remain homogenous after condensation but separates into two layers: an aqueous layer and an alcoholic (or aniline, furfurol, etc.) layer, both layers containing some of the other component.

Referring to the drawing, numeral 1 indicates a feed line which conducts the aqueous mixture to be separated from storage (not shown) to a separator 2. This mixture in the separator may be in either one or two phases, depending on the composition as will be understood, but in either case my process may be used. The alcoholic layer, which also contains some water is decanted and fed to a rectification tower 4, by line 3. The tower may be of any preferred design, but preferably fitted with bell cap plates 5 or equivalent fractionation means. A steam coil 6 is provided at the base of the tower and substantially anhydrous alcohol is withdrawn from the base thru cooler 7 to storage (not shown). Vapor is condensed in a condenser 8, and the distillate is allowed to settle in separator 9, into two layers. The alcoholic layer is decanted and returned to tower 4 as reflux by line 10. The aqueous layers from separators 2 and 9 are withdrawn by lines 11 and 12 respectively and fed to a second rectification tower 13. This tower may be similar to tower 4 and is provided with a heating means 14 which in this case may be an open steam spray. Water or salt solution, as will appear below substantially free of alcohol is withdrawn as a residuum, from tower 13 by line 15 and vapor is condensed in a condenser 16. Distillate separates into two layers in separator 17 and the aqueous layer is returned to tower 13 as reflux by line 18. Pipe 18a is provided by which a strong solution of a highly soluble salt such as $K_2CO_3$ may be added. The solution may be a saturated solution which contains about equal weights of water and $K_2CO_3$ at atmospheric temperature, or it may be somewhat less concentrated containing, say, 50–80% of that amount of salt which would produce saturation at a given temperature. The alcoholic layer may be returned to tower 4 by line 19 and pump 20. Under certain conditions, as will appear below, it is necessary or desirable to operate tower 13 under vacuum and in such case the well known Schneible columns may be used, together with a vacuum pump 21.

In the operation of my process solutions rich in alcohol and water respectively are rectified to produce residua of alcohol and water respectively. Vapor from each rectification step is condensed to form distillate which condenses into aqueous and alcoholic layers. The alcoholic layers are fed to the column from which anhydrous alcohol is produced as a residue and the aqueous layers are returned to the other column. In this manner the feed mixture is separated systematically into an anhydrous mixture of alcohols and water. It will be understood that if the feed be a single phase rich in alcohol it will be fed directly to column 4 and the aqueous layer of the distillate furnishes the feed for column 13 while, on the other hand, if the feed be a single phase rich in water, it will be fed directly to column 13 and the alcoholic layer of the distillate will furnish feed for column 4.

It is also often desirable to add a soluble salt to the aqueous liquid fed to column 13. This is preferably added as a strong aqueous solution of $K_2CO_3$ to the reflux line 18 but it may be added to the line 12, if desired. The salt solution is removed by line 15 and may be concentrated by evaporation in suitable equipment (not shown) and returned to the tower.

If no salt solution is added and the pressure of distillation is identical in towers 4 and 13, the vapors leaving these two towers will tend to have the same composition and to distil over at the same temperature in case the fractionation is very good in the towers. The addition of the salt solution to tower 13 serves the purpose of changing the composition of the mixture leaving this tower in the direction of dryer distillate, i. e., in such a way that it contains less water and more alcohol or other material treated. The same result of making the overhead product of tower 13 dryer can be achieved by using a lower pressure of distillation. This may be achieved by distilling in tower 4 under atmospheric pressure and maintaining a vacuum on tower 13 by means of vacuum pump 21.

By the term "rich in water" I refer to solutions to which water may be added in large quantity without separation of phases, but to which the other component may not be added in large quantity without such separation and in the same sense the term "rich in organic substance" refers to solution to which water may not be added in large quantity without separation of phase, but to which the organic substance may be added.

While I have described my process in reference to aqueous mixtures and particularly in reference to aqueous mixtures of higher alcohols which do not form homogeneous constant boiling mixtures with water, the process may be applied to non-aqueous mixtures of liquids which are only partially miscible and which do not form homogeneous constant boiling mixtures, as will be readily apparent to those skilled in the art.

My invention is not to be limited by any theory of the operation of either step of my process nor of any particular example illustrating its operation, but only by the following claims in which I wish to claim all novelty inherent in the invention,

I claim:

1. An improved process for separating liquid mixtures consisting of higher and lower boiling components which are only partially miscible and which do not form homogeneous constant boiling mixtures, comprising the steps of distilling mixtures rich in the two components respectively in separate distillation zones whereby distillates are obtained which separate on condensation spontaneously into phases rich in the higher and the lower boiling components respectively, feeding the phases rich in the higher boiling component to the distillation zone in which the mixtures rich in the higher boiling component are distilled, withdrawing therefrom a residue richer in the higher boiling component, feeding mixtures rich in the lower boiling component to the other distillation zone and withdrawing therefrom a residue richer in the lower boiling component.

2. An improved process for separating liquid mixtures consisting of water and an organic substance only partially miscible therewith and which does not form homogeneous constant boiling mixture with water, comprising the steps of distilling mixtures rich in water and the organic substances respectively in separate distillation zones whereby distillates which separate on condensation spontaneously into phases rich in water and the organic substance respectively are produced, feeding distillate phases rich in water to the zone in which mixtures rich in water are distilled, withdrawing therefrom a residue substantially richer in water than the feed, feeding distillate phases rich in the organic substance to the other distillation zone and withdrawing therefrom a residue richer in the organic substance than the feed.

3. Process according to claim 2 in which distillation is carried out under rectification conditions.

4. Process according to claim 2 in which the residua withdrawn comprise water substantially free of the organic substance and the organic substance substantially free of water.

5. Process according to claim 2 in which a mixture comprising water and an alcohol higher than isopropyl is substantially dehydrated.

6. Process according to claim 2 in which the distillation of the mixtures rich in water is accomplished under vacuum.

7. Process according to claim 2 in which an aqueous solution of a salt of substantial solubility is added to the distillation zone in which mixtures rich in water are distilled.

8. Process according to claim 2 in which an aqueous solution of potassium carbonate is added to the distillation zone in which mixtures rich in water are distilled.

WARREN K. LEWIS.